2,970,946

PROCESS FOR THE PRODUCTION OF TETRA-CYCLINE BY FERMENTATION

Bernard Chertow, Syracuse, N.Y., assignor to Bristol-Myers Company, New York, N.Y., a corporation of Delaware No Drawing. Filed Feb. 5, 1960, Ser. No. 6,848

12 Claims. (Cl. 195—80)

This invention relates to a process of producing tetracycline by fermentation in a medium containing corn steep liquor from which chloride ion has been removed and, more particularly, removed by means of silver salts.

This application is a continuation-in-part of my prior, copending application S.N. 447,907, filed August 4, 1954, now abandoned.

The majority of commercially suitable fermentation media include constituents derived from natural sources which contain much chloride ion in addition to their nutritive elements. In certain fermentations, e.g. the production of tetracycline by cultivation of a chlortetracycline-producing species of Streptomyces, it is advantageous to remove as much as possible of this chloride ion. Tetracycline is a relatively new, broad-spectrum antibiotic which has been described in J. Amer. Chem. Soc., 75, 4621–4623 (1953) and in Antibiotics Annual, pages 46–107 (1953–1954), and in U.S. Patents 2,734,018 and 2,866,738 to Minieri et al.

It is the object of the present invention to provide a commercially practical process for the production of tetracycline which involves the removal of chloride ion from a constituent of fermentation media, corn steep liquor, without simultaneous removal of valuable nutritive elements from said constituent and without introduction of agents which reduce the yield of the desired product, as by inhibition of the organism or decomposition of the product followed by admixture with other medium constituents such as carbohydrate or other source of carbon and an inorganic source of nitrogen such as ammonium sulfate and, if desired, buffering agents, trace elements and the like and finally, sterilization, inoculation with a chlortetracycline producing species of Streptomyces and submerged, aerobic fermentation.

The object of the present invention has been attained by the provision according to the present invention of, in the process of producing a fermentation broth containing a high ratio of tetracycline to chlortetracycline by cultivating a chlortetracycline-producing species of Streptomyces under submerged aerobic conditions in an aqueous nutrient medium low in chloride and containing assimilable sources of carbon and nitrogen wherein the major source of organic nitrogen is corn step liquor, the steps prior to admixture of the ingredients of the medium which consist, in sequence, of removing solid matter from corn steep liquor, adding to the liquid so obtained a water-soluble salt of silver in an amount stoichiometrically equal to about 125% of the amount of chloride ion present in said liquid and removing from said liquid the silver chloride so precipitated.

In one aspect the present invention provides the process of producing tetracycline which consists in sequence of removing solid matter from corn steep liquor, adding to the liquid so obtained a water-soluble salt of silver in an amount stoichiometrically equal to about 125% to about 200% of the amount of chloride ion present in said liquid and removing from said liquid the silver chloride so precipitated, mixing said dechlorinated corn steep liquor with water and with substantially chloride-free assimilable sources of carbon, of inorganic nitrogen and of metal salts to form the fermentation medium, sterilizing said medium, inoculating said medium with a chlortetracycline-producing species of Streptomyces and aerobically fermenting said inoculated medium.

In one more specific embodiment, the present invention provides, in the process of producing a fermentation broth containing a high ratio of tetracycline to chlortetracycline by cultivating a chlortetracycline-producing species of Streptomyces under submerged aerobic conditions in an aqueous nutrient medium low in chloride and containing assimilable sources of carbon and nitrogen wherein the sole source of organic nitrogen is corn steep liquor, the steps prior to admixture of the ingredients of the medium which consist, in sequence, of removing solid matter from corn steep liquor, adding to the liquid so obtained a water-soluble salt of silver in an amount stoichiometrically equal to about 200% of the amount of chloride ion present in said liquid, removing from said liquid the silver chloride so precipitated and adding to said liquid the water-washed solid matter initially removed to provide corn steep liquor containing less than 400, and preferably less than about 60, parts per million of chloride ion.

In another embodiment the present invention provides a process for producing tetracycline which consists in sequence of removing solid matter from corn steep liquor, adding to the liquid so obtained a water-soluble salt of silver in an amount stoichiometrically equal to about 125% to about 200% of the amount of chlorine ion present in said liquid, removing from said liquid the silver chloride so precipitated and adding to said liquid the water-washed solid matter initially removed to provide corn steep liquor containing less than 400, and preferably less than about 60, parts per million of chloride ion, mixing said dechlorinated corn steep liquor with water and substantially chloride-free assimilable sources of carbon, of inorganic nitrogen and of metal salts to form the aqueous fermentation medium, sterilizing said medium, as by autoclaving, inoculating said medium with a chlortetracycline-producing species of Streptotmyces (e.g. *S. aureofaciens*) and aerobically fermenting said inoculated medium until at least 300 mcg./ml. tetracycline is produced preferably without simultaneous production of more than one-twentieth as much chlortetracycline as tetracycline.

The fermentation process in which use is made of the dechlorinated medium constituents provided by the process of the present invention is in general a process for growing species of micro-organisms at about 24°–35° C. under submerged conditions of agitation and aeration in media consisting of sterile water containing a source of carbon, a source of nitrogen, a source of growth substances, mineral salts such as potassium phosphate, magnesium sulfate, sodium nitrate and, when desired, a buffering agent such as calcium carbonate, said media being substantially free of available chloride ion. It is apparent that many constituents of such media are available in chloride-free form, e.g. sucrose, lactose, inorganic salts, ammonium salts, nitrates, water, calcium carbonate, inoculum, urea, amino acids. Other highly desirable constituents of such media are derived from natural sources and contain much chloride ion in addition to valuable nutritive agents. Thus it is frequently desirable to add to the media certain nitrogen-containing compounds derived from natural sources, e.g. corn steep liquor, soy peptones, linseed meal and others enumerated above; naturally occurring carbohydrates in crude form are also useful, e.g. molasses; these constituents of the media as they occur in nature and in commerce contain large amounts (e.g. 3000 p.p.m. for corn steep liquor, 4000 p.p.m. for molasses) of free, available chloride ion.

In order to remove this chloride ion without loss of the other valuable nutritive elements present, e.g. in the solids of corn steep liquor, it is necessary to remove the solids, as by filtration or centrifugation, treat the filtrate (combined with any dechlorinated water which may have been used to wash said removed solids) with a water-soluble salt of silver, and remove, e.g. by filtration or centrifugation, the precipitate of silver chloride. If desired, the solids originally removed may be combined with the dechlorinated liquid. For economy and ease of operation, the media constituent, e.g. corn steep liquor, is used as supplied or diluted with up to four volumes of chloride-free water. The liquid may be acidified, e.g. with nitric acid, before the addition of the silver salt to prevent the precipitation of silver oxide or hydroxide.

The amount of chloride ion present is easily determined by the usual methods. The relation of the atomic weight of chlorine (35.45) to the molecular weight of chlortetracycline (478.8) indicates that one part of chloride ion in a fermentation medium can produce at most roughly 14 parts (more accurately about 13.5 parts) of chlortetracycline. While absolute removal of chloride ion is desirable and prevents formation of any chlortetracycline at all, it is quite practical to remove during isolation a certain amount (e.g. less than fifty percent and preferably less than twenty-five percent) of chlortetracycline from the tretracycline formed in the fermentation broth. On this basis as applied to the usual commercial broths which contain at least 500 mcg./ml. of tetracycline (i.e. 500 p.p.m.), the media to be substantially free of available chloride ion must contain less than 20 p.p.m. chloride ion. In actual practice for the greatest efficiency, it is desirable that the media of the present invention contain less than 5 p.p.m., and preferably only 1 to 2 p.p.m., of chloride ion. Thus a media constituent to be substantially free of chloride ion must, after dilution as usual in the preparation of the medium, supply no more than 20 p.p.m. chloride ion to the media. Since the maximum acceptable concentration of corn steep, soy bean, meal, cottonseed meal, linseed meal, molasses and the like in such fermentation media is 5%, it is thus apparent that on an undiluted basis such media after dechlorination must contain no more than 400 p.p.m. chloride ion. Such efficient dechlorination is easily achieved by the process of the present invention. It is apparent that even less chloride ion is supplied to the media when such constituents, e.g. corn steep, are used at a level of say 2% instead of 5%.

Example I

Fermentation media were prepared containing 3% sucrose, 2% corn steep, 0.2% (NH$_4$)$_2$SO$_4$, 0.625% CaCO$_3$, 0.003% ZnSO$_4$ and distilled water q.s. 100%. The corn steep was used as commercially available (control) or freed of available chloride ion in the following manner. The corn steep assayed about 3000 p.p.m. chloride ion and was first treated with silver nitrate. Three methods were used:

(A) Simple addition of silver nitrate.

(B) Removal of solids by filtration followed by addition of silver nitrate and then removal of silver chloride by filtration and, finally, recombination by slurrying of the original corn steep solids with the filtrate from the silver chloride precipitation.

(C) Removal of solids by filtration followed by addition of silver nitrate and, finally, removal of precipitated silver chloride by filtration.

The amounts of silver nitrate added (0.54 g.; 0.72 g.; 0.90 g.) were those calculated to precipitate 75%, 100% and 125% of the chloride ion, respectively; in each case 50 ml. corn steep was used. The media were autoclaved, subsequently inoculated with a 1% vegetative inoculum of a chlortetracycline-producing species of Streptomyces, aerobically fermented for 114 hours and analyzed for content of tetracycline and chlortetracycline with the results given in the following table:

| Product in Broth/Media | Controls | A—All Solids In— | | |
|---|---|---|---|---|
| | | 75% | 100% | 125% |
| Chlortetracycline in mcg./ml | 395 | 480 | 380 | |
| Tetracycline in mcg./ml | 155 | 140 | 255 | |
| Percent tetracycline | 28 | 23 | 40 | |

| Product in Broth/Media | Controls | B—Solids filtered—filtrate treated. C.S. solids added | | |
|---|---|---|---|---|
| | | 75% | 100% | 125% |
| Chlortetracycline in mcg./ml | 395 | 255 | 340 | 195 |
| Tetracycline in mcg./ml | 155 | 255 | 280 | 455 |
| Percent Tetracycline | 28 | 50 | 45 | 70 |

| Product in Broth/Media | Controls | C—All Solids Filtered Off | | |
|---|---|---|---|---|
| | | 75% | 100% | 125% |
| Chlortetracycline in mcg./ml | 395 | 395 | 240 | 170 |
| Tetracycline in mcg./ml | 155 | 265 | 240 | 310 |
| Percent Tetracycline | 28 | 40 | 50 | 65 |

The ratio of tetracycline to chlortetracycline was thus increased by the removal of available chloride ion by the addition of silver nitrate in various ways. This effect is apparent even though complete removal of the chloride ion was not attained; thus, it is obvious from the amount of chlortetracycline formed that these media in all cases still contained at least 12 to 34 p.p.m. available chloride ion.

Example II

A fermentation medium was prepared containing 3% sucrose, 2% corn steep, 0.2% (NH$_4$)$_2$SO$_4$, 0.625% CaCO$_3$, 0.003% ZnSO$_4$ and distilled water q.s. 100%. The corn steep liquor contained about 3000 p.p.m. chloride ion which was removed in the following manner. The corn steep was filtered and diluted with four volumes of water; the solids were washed with water which was used to dilute the filtrate. The combined filtrates were acidified with 5 ml. concentrated nitric acid per 100 ml. of original corn steep and dechlorinated by the addition of 200% of the amount of silver nitrate necessary to remove by precipitation all chloride ion present as determined by simple analysis. One reason for the use of excess silver nitrate is the fact that some silver nitrate is removed (reduced to metallic silver) by the reducing sugars in the corn steep. The precipitated silver chloride was removed by filtration and the pH of the filtrate was raised to 3.8 by the addition of potassium hydroxide. The washed, filtered corn steep solids were then added to the filtrate and the resulting dechlorinated corn steep liquor was used to prepare the medium. The medium was autoclaved and inoculated with a 1% vegetative inoculum of a chlortetracycline-producing species of Streptomyces which had been thoroughly washed by decantation with distilled water to remove the greater part of its chloride ion content. This inoculated medium was then aerobically fermented for ninety-six hours to give broth containing 725 mcg./ml. tetracycline equivalents (by ultra-violet absorption analysis) containing 99% tetracycline by differential bio-assay or paper strip chromatography.

Example III

Following the procedure of Example II, except as mentioned specifically below, a chlortetracycline-producing species of Streptomyces was fermented in the same medium, using corn steep dechlorinated with 125% silver nitrate in the following manner:

(A) The corn steep was dechlorinated as in Example II, but was not reconstituted, that is, the solids originally removed by filtration were not put back in.

(B) Exactly as in Example II, that is, the same as in A above but reconstituted.

(C) Exactly as in Example II, or in A above except that the filtrate from removal of corn steep solids was diluted with only one volume of water instead of four.

(D) Untreated, as a control.

Analysis of the broth after 120 hours' fermentation gave the following results:

| Corn Steep | Tetracycline Equivalents by Ultraviolet Assay in mcg./ml. | Percentage Tetracycline | |
| --- | --- | --- | --- |
| | | By Differential Bioassay | By Paper Strip Chromatography |
| A (1:4, not reconstituted) | 600 | 100 | 97–98 |
| B (1:4, reconstituted) | 440 | 96 | 90–95 |
| C (1:1, reconstituted) | 1030 | 100 | >95 |
| D (control, untreated) | 355 | | <50 |

The chlorine ion in p.p.m. of final medium contributed by the corn steep liquor was as follows: A, 1.2; B, 1.4; C, 0.68; D, about 60.

While certain embodiments of this invention have been described in some detail, it will be understood that various modifications may be made in the procedures described (e.g. nutrients, silver salts) without departing from the scope of the invention.

I claim:

1. In the process of producing a fermentation broth containing a high ratio of tetracycline to chlortetracycline by cultivating a chlortetracycline-producing species of Streptomyces under submerged aerobic conditions in an aqueous nutrient medium low in chloride and containing assimilable sources of carbon and nitrogen wherein the major source of organic nitrogen is corn steep liquor, the steps prior to admixture of the ingredients of the medium which consist, in sequence, of removing solid matter from corn steep liquor, adding to the liquid so obtained a water-soluble salt of silver in an amount stoichiometrically equal to about 125% to about 200% of the amount of chloride ion present in said liquid and removing from said liquid the silver chloride so precipitated.

2. In the process of producing a fermentation broth containing a high ratio of tetracycline to chlortetracycline by cultivating a chlortetracycline-producing species of Streptomyces under submerged aerobic conditions in an aqueous nutrient medium low in chloride and containing assimilable sources of carbon and nitrogen wherein the major source of organic nitrogen is corn steep liquor, the steps prior to admixture of the ingredients of the medium which consist, in sequence, of removing solid matter from corn steep liquor, adding to the liquid so obtained a water-soluble salt of silver in an amount stoichiometrically equal to about 125% to about 200% of the amount of chloride ion present in said liquid, removing from said liquid the silver chloride so precipitated and adding to said liquid the water-washed solid matter initially removed.

3. In the process of producing a fermentation broth containing a high ratio of tetracycline to chlortetracycline by cultivating a chlortetracycline-producing species of Streptomyces under submerged aerobic conditions in an aqueous nutrient medium low in chloride and containing assimilable sources of carbon and nitrogen wherein the major source of organic nitrogen is corn steep liquor, the steps prior to admixture of the ingredients of the medium which consist, in sequence, of removing solid matter from corn steep liquor, adding to the liquid so obtained a water-soluble salt of silver in an amount stoichiometrically equal to about 200% of the amount of chloride ion present in said liquid, removing from said liquid the silver chloride so precipitated and adding to said liquid the water-washed solid matter initially removed.

4. In the process of producing a fermentation broth containing a high ratio of tetracycline to chlortetracycline by cultivating a chlortetracycline-producing species of Streptomyces under submerged aerobic conditions in an aqueous nutrient medium low in chloride and containing assimilable sources of carbon and nitrogen wherein the major source of organic nitrogen is corn steep liquor, the steps prior to admixture of the ingredients of the medium which consist, in sequence, of removing solid matter from corn steep liquor, adding to the liquid so obtained a water-soluble salt of silver in an amount stoichiometrically equal to about 200% of the amount of chloride ion present in said liquid, removing from said liquid the silver chloride so precipitated and adding to said liquid the water-washed solid matter initially removed to provide corn steep liquor containing less than 400 parts per million of chloride ion.

5. In the process of producing a fermentation broth containing a high ratio of tetracycline to chlortetracycline by cultivating a chlortetracycline-producing species of Streptomyces under submerged aerobic conditions in an aqueous nutrient medium low in chloride and containing assimilable sources of carbon and nitrogen wherein the sole source of organic nitrogen is corn steep liquor, the steps prior to admixture of the ingredients of the medium which consist, in sequence, of removing solid matter from corn steep liquor, adding to the liquid so obtained a water-soluble salt of silver in an amount stoichiometrically equal to about 125% to about 200% of the amount of chloride ion present in said liquid and removing from said liquid the silver chloride so precipitated.

6. In the process of producing a fermentation broth containing a high ratio of tetracycline to chlortetracycline by cultivating a chlortetracycline-producing species of Streptomyces under submerged aerobic conditions in an aqueous nutrient medium low in chloride and containing assimilable sources of carbon and nitrogen wherein the sole source of organic nitrogen is corn steep liquor, the steps prior to admixture of the ingredients of the medium which consist, in sequence, of removing solid matter from corn steep liquor, adding to the liquid so obtained a water-soluble salt of silver in an amount stoichiometrically equal to about 200% of the amount of chloride ion present in said liquid, removing from said liquid the silver chloride so precipitated and adding to said liquid the water-washed solid matter initially removed.

7. The process of producing tetracycline which consists in sequence of removing solid matter from corn steep liquor, adding to the liquid so obtained a water-soluble salt of silver in an amount stoichiometrically equal to about 125% to about 200% of the amount of chloride ion present in said liquid and removing from said liquid the silver chloride so precipitated, mixing said dechlorinated corn steep liquor with water and with substantially chloride-free assimilable sources of carbon, of inorganic nitrogen and of metal salts to form the fermentation medium, sterilizing said medium, inoculating said medium with a chlortetracycline-producing species of Streptomyces and aerobically fermenting said inoculated medium.

8. The process of producing tetracycline which consists in sequence of removing solid matter from corn steep liquor, adding to the liquid so obtained a water-soluble salt of silver in an amount stoichiometrically equal to about 125% to about 200% of the amount of chloride ion present in said liquid, removing from said liquid the silver chloride so precipitated and adding to said liquid the water-washed solid matter initially removed, mixing said dechlorinated corp steep liquor with water and with substantially chloride-free assimilable sources of carbon, of inorganic nitrogen and of metal salts to form the fermentation medium, sterilizing said medium, inoculating said medium with a chlortetracyline-producing species of Streptomyces and aerobically fermenting said inoculated medium.

9. The process of producing tetracycline which consists in sequence of removing solid matter from corn steep liquor, adding to the liquid so obtained a water-soluble salt of silver in an amount stoichiometrically equal to about 200% of the amount of chloride ion present in said liquid, removing from said liquid the silver chloride so precipitated and adding to said liquid the water-washed solid matter initially removed, mixing said dechlorinated corn steep liquor with water and with substantially chloride-free assimilable sources of carbon, of inorganic nitrogen and of metal salts to form the fermentation medium, sterilizing said medium, inoculating said medium with a chlortetracycline-producing species of Streptomyces and aerobically fermenting said inoculated medium.

10. The process of producing tetracycline which consists in sequence of removing solid matter from corn steep liquor, adding to the liquid so obtained a water-soluble salt of silver in an amount stoichiometrically equal to about 200% of the amount of chloride ion present in said liquid, removing from said liquid the silver chloride so precipitated and adding to said liquid the water-washed solid matter initially removed to provide corn steep liquor containing less than 400 parts per million of chloride ion, mixing said dechlorinated corn steep liquor with water and with substantially chloride-free assimilable sources of carbon, of inorganic nitrogen and of metal slats to form the fermentation medium, sterilizing said medium, inoculating said medium with a chlortetracycline-producing species of Streptomyces and aerobically fermenting said inoculated medium.

11. The process of producing tetracycline which consists in sequence of removing solid matter from corn steep liquor, adding to the liquid so obtained a water-soluble salt of silver in an amount stoichiometrically equal to about 125% to about 200% of the amount of chloride ion present in said liquid and removing from said liquid the silver chloride so precipitated, mixing said dechlorinated corn steep liquor with water and with substantially chloride-free assimilable sources of carbon, of inorganic nitrogen and of metal salts to form the fermentation medium, sterilizing said medium, inoculating said medium with a chlortetracycline-producing species of Streptomyces and aerobically fermenting said inoculated medium until at least 300 mcg./ml. tetracycline is produced.

12. The process of producing tetracycline which consists in sequence of removing solid matter from corn steep liquor, adding to the liquid so obtained a water-soluble salt of silver in an amount stoichiometrically equal to about 200% of the amount of chloride ion present in said liquid, removing from said liquid the silver chloride so precipitated and adding to said liquid the water-washed solid matter initially removed, mixing said dechlorinated corn steep liquor with water and with substantially chloride-free assimilable sources of carbon, of inorganic nitrogen and of metal salts to form the fermentation medium, sterilizing said medium, inoculating said medium with a chlortetracycline-producing species of Streptomyces and aerobically fermenting said inoculated medium until at least 300 mcg./ml. tetracycline is produced.

References Cited in the file of this patent

UNITED STATES PATENTS 2,734,018     Minieri  ---------------- Feb. 7, 1956

FOREIGN PATENTS 781,843     Great Britain ---------- Aug. 28, 1957

OTHER REFERENCES

The Dispensatory of The United States of America, 24th edition, 1947, p. 1038.